US008662472B2

(12) United States Patent
Suzuki et al.

(10) Patent No.: US 8,662,472 B2
(45) Date of Patent: Mar. 4, 2014

(54) ELECTROMAGNETIC FUEL INJECTION VALVE

(75) Inventors: Katsuyuki Suzuki, Tochigi (JP); Gen Kato, Tochigi (JP); Junichi Miyashita, Tochigi (JP); Kenichi Tsunota, Tochigi (JP)

(73) Assignee: Keihin Corporation, Tokyo (JP)

( * ) Notice: Subject to any disclaimer, the term of this patent is extended or adjusted under 35 U.S.C. 154(b) by 1108 days.

(21) Appl. No.: 12/489,069

(22) Filed: Jun. 22, 2009

(65) Prior Publication Data

US 2010/0001215 A1 Jan. 7, 2010

(30) Foreign Application Priority Data

Jul. 7, 2008 (JP) ................................ 2008-177057

(51) Int. Cl.
*F16K 31/02* (2006.01)

(52) U.S. Cl.
USPC ................. 251/129.21; 251/129.15; 123/472; 123/490; 123/368; 239/585.3; 239/585.4; 239/585.5; 239/900

(58) Field of Classification Search
USPC .................. 251/129.21, 129.15, 129.01, 368; 123/472, 490; 239/585.1–585.5, 900
See application file for complete search history.

(56) References Cited

U.S. PATENT DOCUMENTS

| | | | | |
|---|---|---|---|---|
| 4,967,959 | A * | 11/1990 | Wieczorek | 239/104 |
| 5,156,341 | A * | 10/1992 | Terakado et al. | 239/585.4 |
| 5,534,081 | A * | 7/1996 | Takagi et al. | 148/325 |
| 6,616,071 | B2 * | 9/2003 | Kitamura et al. | 239/533.12 |
| 7,775,463 | B2 * | 8/2010 | Abe et al. | 239/585.1 |
| 7,926,745 | B2 * | 4/2011 | Kitagawa et al. | 239/533.11 |
| 2005/0067512 | A1 * | 3/2005 | Shimizu et al. | 239/585.1 |
| 2009/0250034 | A1 * | 10/2009 | Engelhardt et al. | 123/195 R |

FOREIGN PATENT DOCUMENTS

| | | |
|---|---|---|
| JP | 59-211759 | 11/1984 |
| JP | 06-058218 | 3/1994 |
| JP | 11-339621 | 12/1999 |
| JP | 2003-035236 | 2/2003 |
| JP | 3819741 B2 | 6/2006 |

OTHER PUBLICATIONS

Japanese Office Action dated Aug. 1, 2012, 3 pages.

* cited by examiner

*Primary Examiner* — John K Fristoe, Jr.
*Assistant Examiner* — Marina Tietjen
(74) *Attorney, Agent, or Firm* — Arent Fox LLP

(57) ABSTRACT

In an electromagnetic fuel injection valve, a valve housing includes: a cylinder-shaped valve seat member having a valve seat in its front end portion; a magnetic cylindrical body coaxially connected to a rear end portion of the valve seat member; a nonmagnetic cylindrical body coaxially and liquid-tightly welded to a rear end of the magnetic cylindrical body; and a hollow cylindrical stationary core coaxially and liquid-tightly welded to a rear end of the nonmagnetic cylindrical body. A valve assembly is housed in the valve housing and includes: a valve body capable of being seated on the valve seat; and a movable core connected to a rear end of the valve body and opposed to a front end of the stationary core. The valve body and the valve seat member are respectively made of different martensitic stainless steels so that a hardness of the valve body is higher than that of the valve seat member. Accordingly, it is possible to provide an electromagnetic fuel injection valve for alcohol fuel which is capable of preventing the adhesive wear from occurring in the seat portion while a valve body and a valve seat member made of martensitic stainless steel are used.

5 Claims, 2 Drawing Sheets

ELECTROMAGNETIC FUEL INJECTION VALVE

CROSS-REFERENCE TO RELATED APPLICATION

This application claims the priority of Japanese Application No. 2008-177057, filed Jul. 7, 2008, the entire specification, claims and drawings of which are incorporated herewith by reference.

BACKGROUND OF THE INVENTION

1. Field of the Invention

The present invention relates to an electromagnetic fuel injection valve, in which: a valve housing includes: a tubular valve seat member having a valve seat in a front end portion thereof; a magnetic cylindrical body coaxially connected to a rear end portion of the valve seat member; a nonmagnetic cylindrical body coaxially and liquid-tightly welded to a rear end of the magnetic cylindrical body; and a hollow cylindrical stationary core coaxially and liquid-tightly welded to a rear end of the nonmagnetic cylindrical body, a valve assembly is housed in the valve housing and includes: a valve body capable of being seated on the valve seat; and a movable core connected to a rear end of the valve body and opposed to a front end of the stationary core, and a stopper member is provided to the valve housing so as to catch the valve body and thus to restrict an opening stroke of the valve body, wherein each of the valve body and the valve seat member is made of a martensitic stainless steel, and especially relates to an electromagnetic fuel injection valve improved to be suitable for the injection of alcohol fuel.

2. Description of the Related Art

Such an electromagnetic fuel injection valve is known from the Japanese Patent No. 3819741.

Such an electromagnetic fuel injection valve has been developed to be suitable for gasoline fuel injection. However, when used to inject alcohol fuel, this electromagnetic fuel injection valve proves to have a significantly degraded performance. The inventors have found that the degraded performance is attributable to the following.

A valve body and a valve seat member each generally made of a martensitic stainless steel are hardened to a desirable degree by their heat treatment. When the electromagnetic fuel injection valve is used to inject alcohol fuel, adhesive wear occurs in a seat portion where the valve body is seated on the valve seat member under the influence of formic acid and acetic acid existing in the alcohol fuel. As a result, the opening degree between the valve body and the valve seat increases, and the increased opening degree increases the amount of injected fuel. Otherwise, the area of a seat portion between the valve body and the valve seat increases, and this increases an adhering force of the valve body. As a result, the responsiveness of the valve body for its opening operation decreases, and this accordingly decreases the amount of injected fuel.

Against this background, a special material exhibiting a stronger resistance against the alcohol fuel, such as X15NT that is a high-grade martensitic stainless steel, may be selected to form the valve body and the valve seat member. However, such a material is so expensive that the costs for the electromagnetic fuel injection valve considerably increases. For this reason, the choice of such a material is not favorable.

SUMMARY OF THE INVENTION

The present invention has been made with this condition taken into consideration. An object of the present invention is to provide an electromagnetic fuel injection valve in which a valve body and a valve seat member made of martensitic stainless steel are used, and which are capable of preventing the adhesive wear from occurring in the seat portion even though the electromagnetic fuel injection valve is used to inject the alcohol fuel.

In order to achieve the above-described object, according to a first feature of the present invention, there is provided an electromagnetic fuel injection valve, in which: a valve housing includes: a tubular valve seat member having a valve seat in a front end portion thereof; a magnetic cylindrical body coaxially connected to a rear end portion of the valve seat member; a nonmagnetic cylindrical body coaxially and liquid-tightly welded to a rear end of the magnetic cylindrical body; and a hollow cylindrical stationary core coaxially and liquid-tightly welded to a rear end of the nonmagnetic cylindrical body, a valve assembly is housed in the valve housing and includes: a valve body capable of being seated on the valve seat; and a movable core connected to a rear end of the valve body and opposed to a front end of the stationary core, and a stopper member is provided to the valve housing so as to catch the valve body and thus to restrict an opening stroke of the valve body, wherein each of the valve body and the valve seat member is made of a martensitic stainless steel, and wherein the valve body and the valve seat member are respectively made of different martensitic stainless steels so that a hardness of the valve body is higher than that of the valve seat member.

According to the first feature of the present invention, the valve body and the valve seat member are respectively made of the different martensitic stainless steels so that the hardness of the valve body can be higher than that of the valve seat member. This can reduce adhesive wear in the valve body and the valve seat member, even when the electromagnetic fuel injection valve is used to inject alcohol fuel. Accordingly, the better fuel injection characteristic exhibiting the small change rate of the injected fuel amount can be stabilized for a long time. Furthermore, because the electromagnetic fuel injection valve can do without an expensive special material to inject alcohol fuel, cost increase can be suppressed.

According to a second feature of the present invention, in addition to the first feature, the stopper member is made of a martensitic stainless steel different from the martensitic stainless steel used for the valve body so that a hardness of the stopper member is lower than that of the valve body.

According to the second feature of the present invention, the stopper member is made of the martensitic stainless steel different from the martensitic stainless steel used for the valve body so that the hardness of the stopper member can be lower than that of the valve body. This can reduce adhesive wear in the abutment portion between the valve body and the stopper member. Consequently, the change in the opening stroke of the valve body is suppressed, so that the favorable fuel injection characteristic can be stabilized further.

According to a third feature of the present invention, in addition to the first feature, a passivation film is formed on a surface of each of the valve body and the valve seat member by passivation treatment.

According to the third feature of the present invention, a passivation film is formed on the surface of each of the valve body and the valve seat member by passivation treatment. This can enhance the anti-corrosive performances of the valve body and the valve seat member as well as the merchantability of the electromagnetic fuel injection valve.

An embodiment of the present invention will be explained below by reference to the attached drawings.

DESCRIPTION OF THE PREFERRED EMBODIMENT

Figure 1:
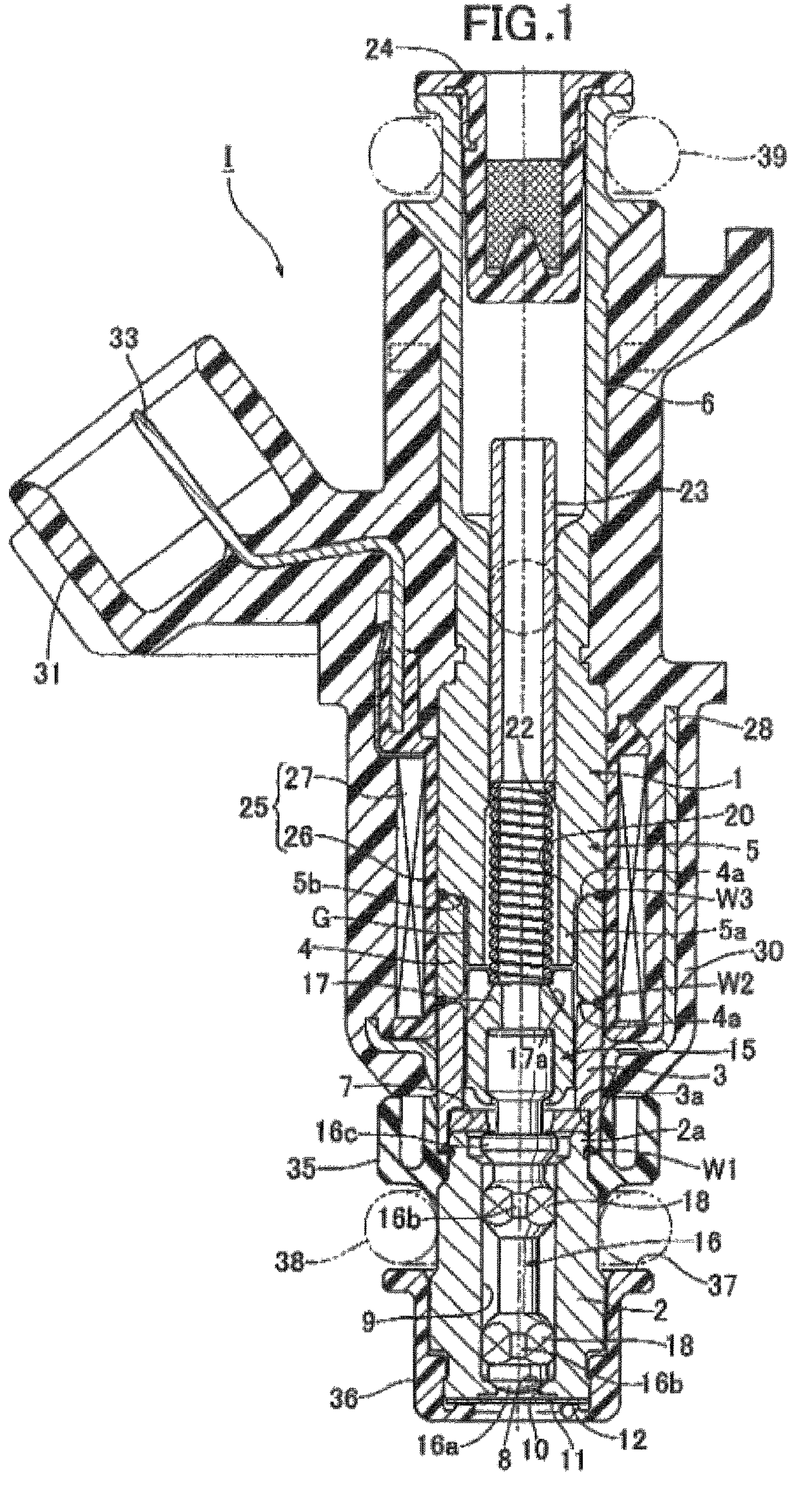
FIG. 1 is a vertical cross-sectional view of an electromagnetic fuel injection valve for an internal combustion engine according to an embodiment of the present invention.

First, in FIG. 1, a valve housing 1 of an electromagnetic fuel injection valve I includes a cylindrical valve seat member 2, a magnetic cylindrical body 3 coaxially connected to a rear end portion of the valve seat member 2 with a C-shaped stopper member 7 interposed therebetween, a nonmagnetic cylindrical body 4 coaxially connected to a rear end of the magnetic cylindrical body 3, a hollow cylindrical stationary core 5 coaxially connected to a rear end of the nonmagnetic cylindrical body 4, and a fuel inlet tube 6 coaxially and continuously provided to a rear end of the stationary core 5.

The valve seat member 2 has a connecting tube part 2*a*, which has a reduced diameter, at its rear end portion, and the magnetic cylindrical body 3 has an annular recess part 3*a* at an inner periphery of its front end portion. The connecting tube part 2*a* is press-fitted into the annular recess part 3*a*. Here, the stopper member 7 is sandwiched between an inner end face of the annular recess part 3*a* and an end face of the connecting tube part 2*a*. A front end face of the magnetic cylindrical body 3 is connected by laser welding to the connecting tube part 2*a* over the entire periphery (the welded part is denoted by reference numeral W1). In this way, the valve seat member 2 and the magnetic cylindrical body 3 are coaxially and liquid-tightly connected to each other.

Further, the magnetic cylindrical body 3 and the nonmagnetic cylindrical body 4 are coaxially and liquid-tightly connected together by laser welding over their entire peripheries at mutually abutting end surfaces thereof (the welded part is denoted by reference numeral W2). These magnetic cylindrical body 3 and nonmagnetic cylindrical body 4 are disposed so as to make their inner peripheral surfaces and outer peripheral surfaces continuous and flush with each other by equalizing their inner and outer diameters. Tapered surfaces 4*a*, 4*a* are formed on inner peripheral edge portions at axially opposite ends of the nonmagnetic cylindrical body 4.

Further, the nonmagnetic cylindrical body 4 and the stationary core 5 are coaxially and liquid-tightly connected together by laser welding over their entire peripheries at mutually abutting end surfaces thereof (the welded portion is denoted by reference numeral W3). A suction tubular part 5*a* jutting out into the inside of the nonmagnetic cylindrical body 4 is formed in the stationary core 5. An annular gap G is provided between the outer peripheral surface of this suction tubular part 5*a* and the inner peripheral surface of the nonmagnetic cylindrical body 4. The annular gap G is set up so that a pressurized fluid used to check the liquid-tightness of the welded portion W3 can enter the annular gap G smoothly, and so that the suction capability of the suction tubular part 5*a* can be satisfied. A fillet 5*b* is formed in the base end portion of the suction tubular part 5*a*. This fillet 5*a* is placed inward of the tapered surface 4*a* of the inner peripheral edge of the rear end portion of the nonmagnetic cylindrical body 4.

The valve seat member 2 is formed with a conical valve seat 8 having a downstream end opened at a front end face of the valve seat member, a cylindrical guide hole 9 leading to an upstream end, that is, a large-diameter part of the valve seat 8, and a valve hole 10 passing through the center part of the valve seat 8. An injector plate 12 having one or a plurality of fuel injection holes 11 communicating with the valve hole 10 is liquid-tightly welded to the front end of the valve seat member 2.

The valve assembly 15 is housed in the valve housing 1. The valve assembly 15 comprises a valve body 16 housed in an axially slidable manner in the guide hole 9, and a movable core 17 integrally connected by crimping to the rear end part of the valve body 16. The valve assembly 15 is arranged so that a rear end of the movable core 17 and a front end of the suction tubular part 5*a* of the stationary core 5 are opposed to each other within the nonmagnetic cylindrical body 4. A plurality of cutouts 17*a* communicating a hollow part 20 of the stationary core 5 with both inner sides of the magnetic cylindrical body 3 and the nonmagnetic cylindrical body 4 are formed in the rear end of the movable core 17.

The valve body 16 is integrally provided with a spherical valve part 16*a* capable of being seated on the valve seat 8, a pair of front and rear journal parts 16*b*, 16*b* slidably supported by the guide hole 9, and a flange 16*c* abutting against the stopper member 7 and defining the open limit of the valve body 16. Each of the journal parts 16*b* is provided with a plurality of chamfered parts 18 allowing passing of the fuel.

A coil-shaped valve spring 22 urging the movable core 17 in a closing direction of the valve body 16, that is, in a direction to seat on the valve seat 8, and a pipe-shaped retainer 23 supporting a rear end of the valve spring 22 are housed in the hollow part 20 of the stationary core 5. A fuel filter 24 is installed in an inlet of the fuel inlet tube 6.

A coil assembly 25 is fitted around outer peripheries of the magnetic cylindrical body 3 and the stationary core 5. The coil assembly 25 comprises a bobbin 26 fitted around outer peripheral surfaces of the magnetic cylindrical body 3 and the stationary core 5, and a coil 27 wound around the bobbin 26. A coil housing 28 surrounding the coil assembly 25 is connected at one end portion thereof by welding to the outer peripheral surface of the magnetic cylindrical body 3.

The coil housing 28, the coil assembly 25 and the stationary core 5 are embedded inside a covering member 30 made of a synthetic resin, and a coupler 31 housing a connecting terminal 33 leading to the coil 27 is integrally and continuously provided in an intermediate portion of the covering member 30.

An annular seal holder 35 stretches and is fitted to the outer peripheries of a portion of the magnetic cylindrical body 3 and a portion of the valve seat member 2. An annular groove 37 is formed between this seal holder 35 and a cap 36 fitted to the front end portion of the valve seat member 2. The cap 36 is made of a synthetic resin. An O-ring 38 configured to be in tight contact with the outer peripheral surface of the valve seat member 2 is attached to this annular groove 37. When the electromagnetic fuel injection valve I is installed into a fuel injection valve installation hole (not illustrated) formed in an engine, this O-ring 38 is configured to be in tight contact with the inner peripheral surface of the installation hole.

Another O-ring 39 is attached to the outer periphery of the inlet portion of the fuel inlet tube 6. This O-ring 39 is configured to be in tight contact with the inner peripheral surface of a fuel distribution pipe (not illustrated) fitted to the outer periphery of the fuel inlet tube 6.

Accordingly, in a state where the coil 27 is being demagnetized, the movable core 17 and the valve body 16 are pressed forward by the biasing force of the valve spring 22, and the valve part 16*a* is seated on the valve seat 8. Consequently, the high-pressure fuel having supplied to the fuel inlet tube 6 is filled into the insides respectively of the stationary core 5, the nonmagnetic cylindrical body 4, the magnetic cylindrical body 3 and the valve seat member 2, and thereafter waits for the valve hole to be open.

Once the coil 27 is electrically connected, the magnetic flux produced by the electricity sequentially passes the stationary core 5, the coil housing 28, the magnetic cylindrical body 3 and the movable core 17. Thus, the movable core 17 is sucked to the suction tubular part 5*a* of the stationary core 5 due to the magnetic force. Consequently, the valve body 16 configured to move together with this movable core 17 is separated away from the valve seat 8, and the valve hole 10 is opened. For this reason, the high-pressure fuel inside the valve seat member 3 goes through the chamfered parts 18 of the valve body 16, and then the valve seat 8 and the valve hole 10. Thereafter, the high-pressure fuel is injected from the fuel injection holes 11 to an intake port (not illustrated) of an internal combustion engine. While the fuel is being injected, the flange 16*c* of the valve body 16 is caught by the stopper member 7, and the opening valve stroke is accordingly restricted to be within a certain range.

In the electromagnetic fuel injection valve I thus configured, the valve body 16 and the valve seat member 2 are respectively made of different martensitic stainless steels so that the hardness of the valve body 16 can be higher than that of the valve seat member 2. In addition, a passivation film is formed on the surface of each of the valve body 16 and the valve seat member 2 by passivation treatment.

Example 1

The valve body 16 is made of ATS34 stainless steel (hardness HV=780), and the valve seat member 2 is made of SUS440C stainless steel (hardness HV=740).

Example 2

The valve body 16 is made of ATS34 stainless steel (hardness HV=780), and the valve seat member 2 is made of SUS420J2 stainless steel (hardness HV=650 to 700).

Comparative Example 1

The valve body 16 is made of SUS440C stainless steel (hardness HV=740, and the valve seat member 2 is made of ATS34 stainless steel (hardness HV=780).

Comparative Example 2

Both the valve body 16 and the valve seat member 2 are respectively made of SUS440C stainless steel (hardness HV=740).

In order for each material used for Examples 1 and 2 as well as Comparative Examples 1 and 2 to have the corresponding hardness, the material was quenched at a temperature of 950° to 1000°, and thereafter tempered at a temperature of 180° to 250°.

For each of Examples 1 and 2 as well as Comparative Examples 1 and 2, multiple electromagnetic fuel injection valves I in which the valve body 16 and the valve seat member 2 each of which is made of the corresponding material are installed were prepared with the same specification. For each of the thus-prepared electromagnetic fuel injection valves I, a fuel injection test was carried out approximately 300,000,000 times by use of alcohol fuel, and the rate of change in the amount of fuel injected when the valve was opened for 2 micro-seconds was checked. The rate (%) of change is obtained by [((the amount of injected fuel at the last stage of the test)−(the amount of injected fuel at the initial stage of the test))/(the amount of injected fuel at the initial stage of the test)]. The result of the check was obtained as shown in the graph of FIG. 2.

Figure 2:
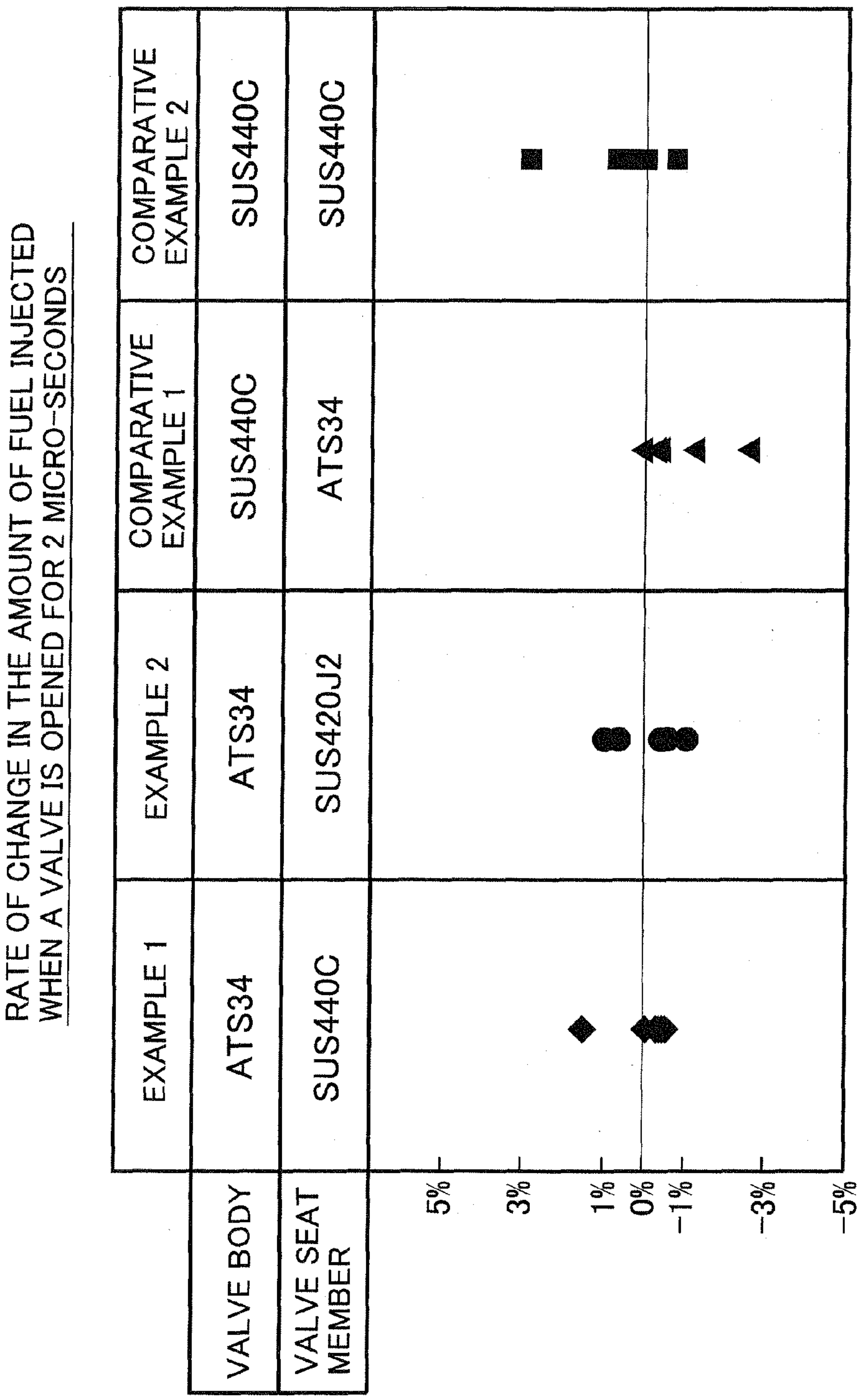
FIG. 2 is a comparison graph of a rate of change in the amount of injected fuel based on an alcohol fuel injection test.

In FIG. 2, the positive direction ("+") of the change rate of injected fuel amount indicates increase of the amount of injected fuel each time the valve body 16 was opened, whereas the negative direction ("−") indicates decrease thereof. The amount of injected fuel increased, because the opening degree between the valve seat 8 and the valve body 16 increased due to the adhesive wear therein. The amount of injected fuel decreased, because the area in which the valve body 16 was seated on the valve seat 8 increased due to the adhesive wear in the valve body 16 and the valve seat 8 so that the responsiveness of the valve body 16 for its opening operation decreased due to the effect of adhesion therebetween.

The change rate of injected fuel amount was smaller in each of Examples 1 and 2, in which the valve body 16 and the valve seat member 2 were respectively made of the different martensitic stainless steels so that the hardness of the valve body 16 can be higher than that of the valve seat member 2. Consequently, the adhesive wear in the valve body 16 and the valve seat 8 was smaller in each of Examples 1 and 2.

In contrast, the change rate of injected fuel amount increased in its negative direction ("−" side), and the adhesive wear in the valve body 16 and the valve seat 8 was larger, in Comparative Example 1, in which the valve body 16 was made of the material used for the valve seat member 2 in Example 1 whereas the valve seat member 2 was made of the material used for the valve body 16 in Example 1.

In addition, the change rate of injected fuel amount increased mainly in the positive direction ("+" side) to a large extent, and the adhesive wear in the valve body 16 and the valve seat 8 was larger, in Comparative Example 2, in which the valve body 16 and the valve seat member 2 were both made of the same martensitic stainless steel with the same hardness.

As clear from the foregoing descriptions, in the electromagnetic fuel injection valve I in which the valve body 16 and the valve seat member 2 are made of the different martensitic stainless steels so that the hardness of the valve body 16 can be higher than that of the valve seat member 2, the adhesive wear in the valve body 16 and the valve seat 8 is small even when the electromagnetic fuel injection valve I is used to inject alcohol fuel. Consequently, the better fuel injection characteristic exhibiting a smaller change rate of injected fuel amount can be stabilized for a long time. Furthermore, because the electromagnetic fuel injection valve can do without an expensive special material to inject alcohol fuel, cost increase can be suppressed.

Moreover, the passivation film is formed on the surface of each of the valve body 16 and the valve seat member 2 through the passivation treatment. This can enhance the anticorrosive performances of the valve body 16 and the valve seat member 2 as well as the merchantability of the electromagnetic fuel injection valve I.

Furthermore, if the stopper member 7 is made of a martensitic stainless steel different from the martensitic stainless steel used for the valve body 16 so that the hardness of the stopper member 7 can be lower than that of the valve body 16, the adhesive wear in the abutment portion between the valve body 16 and the stopper member 7 can be reduced. Consequently, the change in the opening stroke of the valve body 16 is suppressed, so that the favorable fuel injection characteristic can be stabilized further.

The present invention is not limited to the above-described embodiment and may be modified in a variety of ways as long as the modifications do not depart from its gist.

What is claimed is:

1. An electromagnetic fuel injection valve, in which:

a valve housing includes: a tubular valve seat member having a valve seat in a front end portion thereof; a magnetic cylindrical body coaxially connected to a rear end portion of the valve seat member; a nonmagnetic cylindrical body coaxially and liquid-tightly welded to a rear end of the magnetic cylindrical body; and a hollow cylindrical stationary core coaxially and liquid-tightly welded to a rear end of the nonmagnetic cylindrical body, a valve assembly is housed in the valve housing and includes: a valve body capable of being seated on the valve seat; and a movable core connected to a rear end of the valve body and opposed to a front end of the stationary core, and a stopper member is provided to the valve housing so as to make the valve body abut against the stopper member and thus to restrict an opening stroke of the valve body, wherein each of the valve body and the valve seat member is made of a martensitic stainless steel, and wherein the valve body and the valve seat member are respectively made of different martensitic stainless steels so that a hardness of the valve body is higher than that of the valve seat member, wherein the stopper member is made of a martensitic stainless steel different from the martensitic stainless steel used for the valve body so that a hardness of the stopper member is lower than that of the valve body.

2. The electromagnetic fuel injection valve according to claim 1, wherein a passivation film is formed on a surface of each of the valve body and the valve seat member by passivation treatment.

3. The electromagnetic fuel injection valve according to claim 1, wherein the movable core also encompasses the rear end of the valve body.

4. The electromagnetic fuel injection valve according to claim 3, wherein the movable core comprises at least one cutout formed on an end of the movable core opposing the front end of the stationary core.

5. The electromagnetic fuel injection valve according to claim 4, wherein the at least one cutout places a hollow port of the stationary core in communication with an inner chamber of the magnetic cylindrical body and the nonmagnetic cylindrical body.

* * * * *